(No Model.)
H. LOWE.
DEVICE FOR MEASURING THE HEIGHT OF HORSES.
No. 414,232. Patented Nov. 5, 1889.
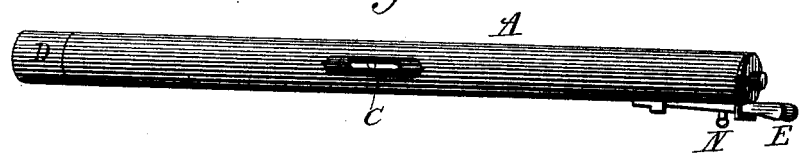
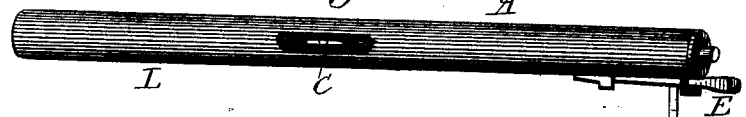
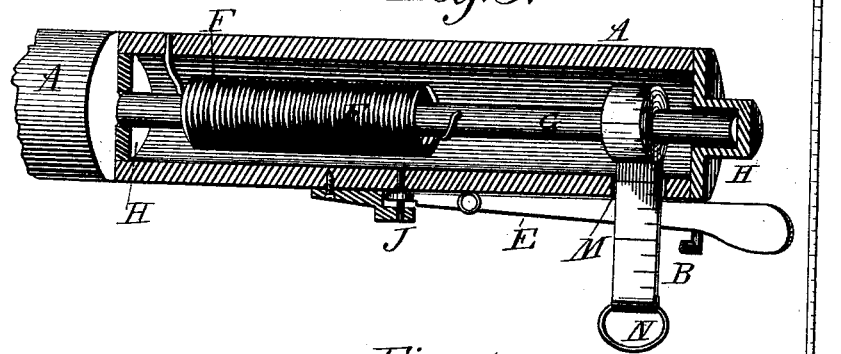
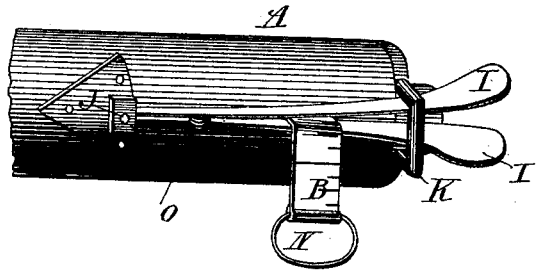
Witnesses
Edw. H. Leavitt
Rufus R. Walker
Inventor
Harry Lowe
By T. J. Leavitt
his Atty.

UNITED STATES PATENT

HARRY LOWE, OF MONTPELIER, VERMONT.

DEVICE FOR MEASURING THE HEIGHT OF HORSES.

SPECIFICATION forming part of Letters Patent No. 414,232, dated November 5, 1889.

Application filed December 12, 1888. Serial No. 293,400. (No model.)

*To all whom it may concern:*

Be it known that I, HARRY LOWE, a citizen of the United States, residing at Montpelier, in the county of Washington and State of Vermont, have invented a new and useful Measure, of which the following is a specification.

My invention consists of a measure or standard for measuring the height of a horse.

The object of my invention is, first, to provide a measure that will enable any one to quickly ascertain the height of any horse in hands, inches, and fractions of inches with absolute correctness; second, to provide a device or measure by which any horse can be easily approached and measured without causing the animal unnecessary fear and consequent uneasiness; third, to provide a device or measure that will occupy such small space as to be conveniently carried in the hand and easily transported when not in use. I attain said objects by the mechanism illustrated by the different figures in the accompanying drawings.

Like letters designate like parts.

Figure 1 is a view of my device as it appears when not in use, in which A is the body; C, a level attached to body A; D, a detachable weight fastened to the end of body A. N is a ring fastened to one end of a hidden flexible measure B, coiled in one end of body A. E is a securer attached to body A for grasping the flexible measure.

Fig. 2 is a view of my device as it appears when ready for use, showing the detachable weight D removed from the end of body A and fastened to the ring N at one end of the flexible measure B, thereby drawing the flexible measure B from body A. The flexible measure B is graduated and marked in hands, inches, and fractions of an inch.

Fig. 3 is an internal view of the hidden mechanism of my device in one end of body A, which consists of an arbor G, made to revolve in bearings H H. On arbor G is a coiled spring F, one end of which is firmly fastened to the arbor G and the other end to body A. The flexible measure B is wound on the arbor G with one end firmly attached to it, with the other end free to pass and slide through aperture M in body A. At the free end of the flexible measure B is ring N, for attaching the detachable weight D. This mechanism is arranged to automatically coil the flexible measure B on the arbor G inside of the body A, either by lowering the body A or removing weight D from the end of the flexible measure B.

Fig. 4 is an enlarged view of the securer E, fastened to body A, of which I I are two metal pieces parallel with each other through frame K, hinged at one end by pivot J, and held apart by a small coiled spring O sufficiently to allow the flexible measure B to pass and slide between them.

To obtain the exact height of a horse with my device, detach weight D from body A and attach it to ring N at the end of the flexible measure B. That portion of the body A designated by letter L in Fig. 2 is rested on the horse, and weight D, released from the hand, immediately uncoils the flexible measure B sufficiently to allow weight D to rest on the ground or floor, as shown in Fig. 2. The thumb and finger of the right hand are then placed on that part of the securer E marked I I in Fig. 4, and by pinching securer E the flexible measure B is tightly clasped. One end of the body A is then slightly elevated to raise the detachable weight D from the ground or floor, which converts the flexible measure B, with weight D at lower end, into a flexible measuring plumb-line. Then weight D is again allowed to rest on the ground or floor on the level of the horse's feet when the flexible measure is plumb. Securer E is then released, and when level C shows body A to be level the securer E is instantly closed, grasping the flexible measure B, and that part of measure B outside of body A denoted by securer E shows the exact height of the horse.

In the manufacture of my device body A can be made of wood, metal, or any equivalent substance, and the flexible measure of any flexible material suitable to operate as a combined flexible measure and plumb-line.

I am aware that my invention may be made in any convenient shape, and I therefore do not confine it to the cylinder shape shown in the drawings.

I am also aware that weight D may be firmly attached to measure B and attached to body A in different ways when not in use. I therefore do not confine my invention strictly to the way weight D is shown to attach to body A, but claim it attached in any equivalent convenient way; nor do I confine my invention strictly to the way herein described of automatically winding and unwinding the flexible measure B from and into body A. I am aware it may be done in many different ways, and I claim it in any convenient equivalent way.

Having thus described my invention, what I claim as new, and desire to secure by Letters Patent, is—

A measure or standard for obtaining the height of a horse, consisting of body A, having level C attached to ascertain the horizontal or plane of the horse's back the height of which is to be taken, flexible measure and plumb-line B, automatically winding into body A to ascertain the perpendicular, and securer E at the angle or point where the horizontal and perpendicular lines of the device meet to grasp measure B at the point where it denotes the height of the horse at the instant the device is properly adjusted, all substantially as shown and described.

HARRY LOWE.

Witnesses:
 THOMAS J. DEAVITT,
 R. R. RIKER.